Aug. 14, 1956　　　V. J. DAVID　　　2,758,483
CHAIN LINK
Filed March 25, 1953　　　　　　　　2 Sheets-Sheet 1
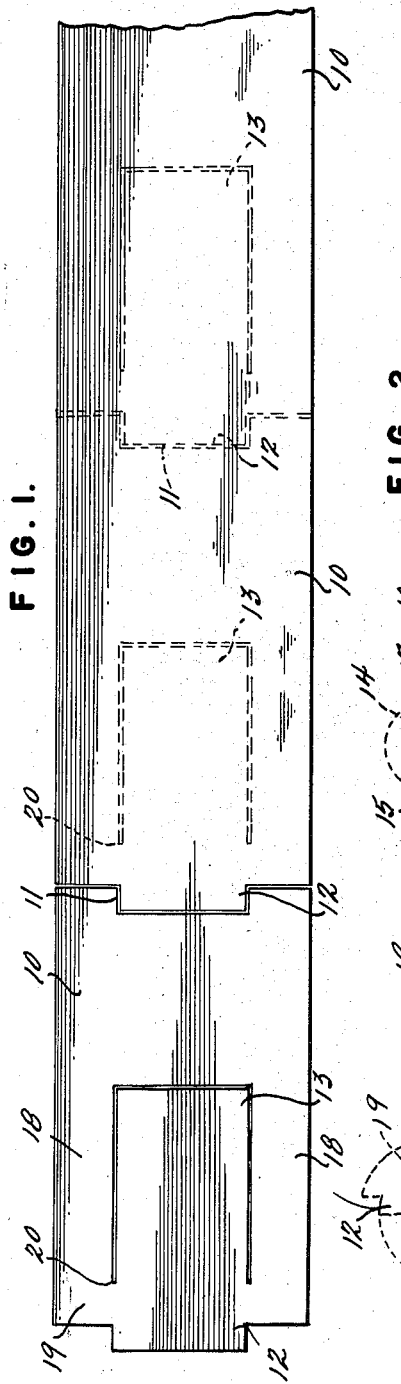
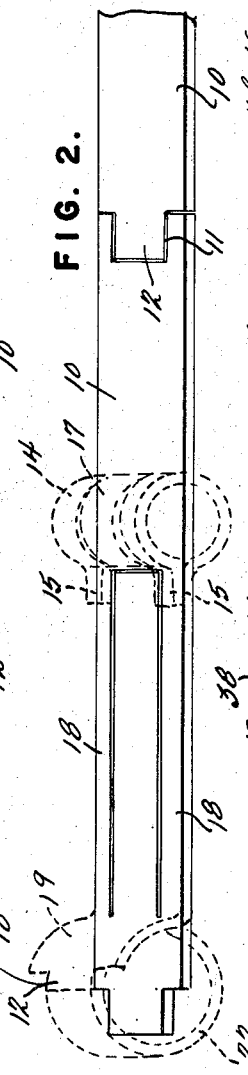
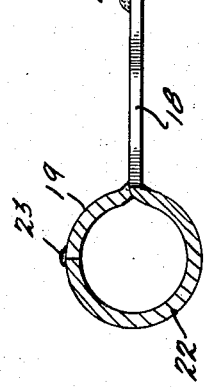
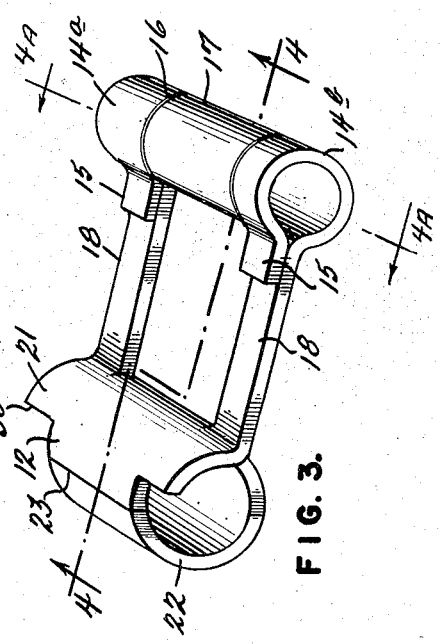
INVENTOR
VERNON J. DAVID
BY
*Semmes & Semmes*
ATTORNEYS Aug. 14, 1956 V. J. DAVID 2,758,483
CHAIN LINK
Filed March 25, 1953 2 Sheets-Sheet 2
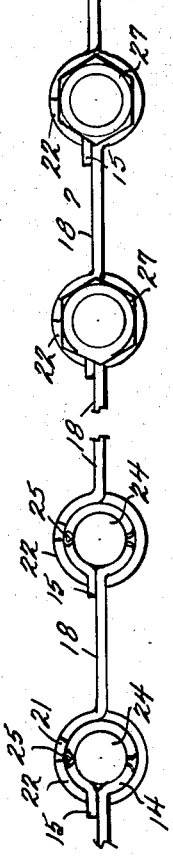
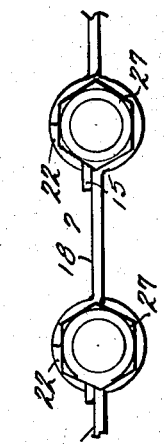
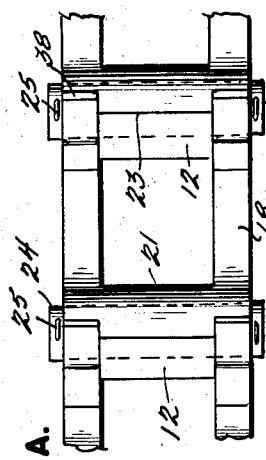
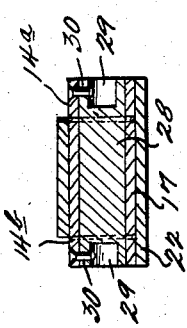
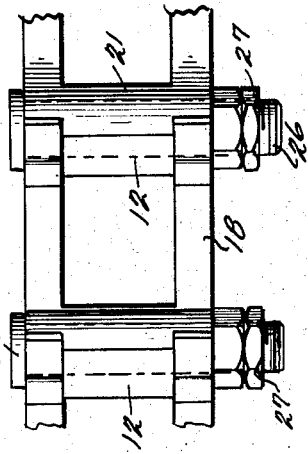
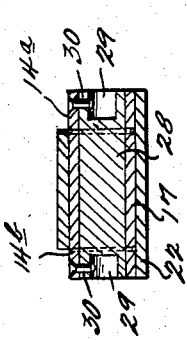
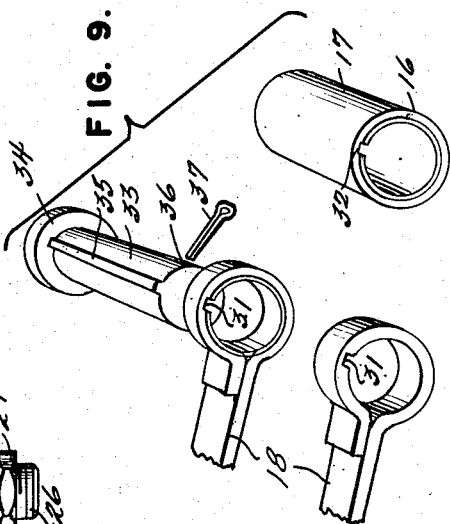
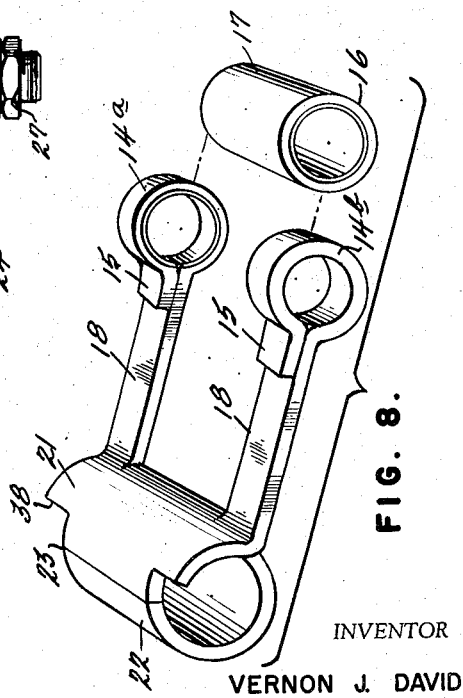
INVENTOR
VERNON J. DAVID
BY
Semmes & Semmes
ATTORNEYS

United States Patent Office 2,758,483
Patented Aug. 14, 1956

2,758,483

CHAIN LINK

Vernon J. David, Durham, Kans.

Application March 25, 1953, Serial No. 344,530

12 Claims. (Cl. 74—250)

This invention relates broadly to chain links and the present application is a continuation in part of my copending application Serial No. 100,034, filed March 7, 1949, now Patent No. 2,645,133.

The chain link of the present invention broadly consists of a single hollow cylindrical knuckle located centrally at one end of a link and either a pair of laterally spaced hollow cylindrical knuckles at the other end of the link or a solid knuckle with provision being made for transforming the knuckle into laterally spaced knuckles by removal of a center section thereof. The removability of a center section of the link makes it possible to quickly and easily detach one link from another and subsequently to reattach the links through the use of connecting pins or the like.

The knuckle having the removable section or sleeve in the present invention is generally of smaller diameter than that of the other knuckle. The outside diameter of the smaller knuckle is substantially equal to the inside diameter of the larger knuckle. Where laterally spaced smaller diameter knuckles are used their inner end edges are immediately outside of the planes defining the outer end edges of the single knuckle so that a plurality of links can be readily secured together to form a continuous chain link by inserting the single knuckle of one link between the laterally spaced knuckles of an adjoining link. Thereafter the two links are connected together by a transverse pin seated in the aligned single and laterally spaced knuckles of connecting links.

Links of this general character have been known and used before. The links according to the invention can be used for various and divers purposes but particularly to form chains adapted to be driven by sprockets and to provide driving connections between two or more shafts.

It is an object of the present invention to provide an improved chain link of the type described. It is also an object of the present invention to provide an improved chain link which is simple in construction and which is sturdy and strong and positive in operation.

Another object of the invention is to provide an improved link for a chain, and which link is formed from a single blank of sheet material, and in which the strength of the link as compared with known links is increased due to the larger knuckle incorporating a weld therein and having an increased diameter. This knuckle, due to its construction, is unable to bend or spring open under heavy loads which is a shortcoming in some known detachable link chains.

It is a further object of the invention to provide a link in which the load carried at the juncture of the knuckle and connecting legs is transferred to other portions of the link in a highly advantageous manner whereby the link is strengthened throughout and a better load distribution is provided. In the formation of the link from sheet material, the diameter of the larger knuckle is increased by using stock from a preceding blank left from the formation of attaching means for the smaller knuckle thereby eliminating waste. The increased diameter permits use of a connecting pin of sufficient diameter for adequate strength when a link is separated from an adjoining link and reattached by use of such a pin.

Still another object of the invention is to provide laterally directed extensions on the larger knuckle which are of arcuate configuration and disposed concentrically with the axis of the knuckle. These extensions are adapted to slidably engage the outer surface of a smaller knuckle to which the larger knuckle is connected in a continuous chain. The lateral extensions also provide a limiting abutment by coaction with the attaching means of a smaller knuckle.

A still further objection of the invention is to provide a chain link wherein the smaller knuckle is continuous across its width thereby eliminating the necessity of a bushing or sleeve for connecting with adjacent contiguous links but wherein a central section of the smaller knuckle is removable for easy detachability of links for repair or the like. The removable section has the same width as the width of the larger knuckle and, upon reassembling the chain, the removable section can be utilized as a connecting link with the use of a connecting pin. In practice where the central section has not been removed from the smaller knuckle the smaller knuckle is placed in position on a succeeding link blank and thereafter the larger knuckle is formed therearound and welded to complete the link connection.

A further object of the invention is to provide means for holding the removable section firmly in place when reassembling the chain in an easily effected manner and to provide means whereby relative rotation of the reinserted center section is prevented with relation to the remainder of the structure of the smaller knuckle.

Further objects and advantages of the present invention residing in the particular structure of the invention will be apparent from the following detailed description of embodiments of the invention taken together with the accompanying drawings in which:

Figure 1 is a plan view of a plurality of separate consecutive blanks for forming links of the present invention;

Figure 2 is a perspective view of the blanks of Figure 1 showing in dotted lines the formation of the end knuckles from the material;

Figure 3 is a perspective view of a completed link;

Figure 4 is a sectional view taken on the line 4—4 of Figure 3;

Figure 4A is a fragmentary sectional view taken on line 4A—4A of Fig. 3 showing the shape and relative size of center section break lines.

Figures 5A and 5B are end elevational views of a chain showing connected links and different modifications of connecting pins;

Figures 6A and 6B are plan views corresponding to Figures 5A and 5B respectively;

Figure 7 is a sectional view of a further modification of a connecting pin and securing means therefor;

Figure 8 is an exploded perspective view of a single link showing the removable center section of the smaller knuckle displaced; and Figure 9 is a partial exploded perspective view corresponding to a portion of Figure 8 and showing a connecting pin having means for preventing relative rotation between the removable section and the smaller knuckle.

In the drawings, wherein like reference characters are used throughout the several views to designate like parts, the blanks of sheet material of desired dimensions and thickness for forming individual links are generally designated at 10. These blanks can be cut from a continuous sheet of material. In one end of each blank a rectangular cut-out 11 is provided which forms on the next succeeding blank a rectangular shaped projection 12. The blanks are further provided with cuts forming three sides of a rectangular shaped cut portion 13, which, as will be seen hereinafter, later forms a major component of the material for forming the larger knuckle.

In forming a link from a blank 10, that end having the cut-out 11 therein is bent around a suitable mandrel to form the smaller knuckle 14 having a circular cross-section and in which the material remaining on the outside of the cut 11 to the border of the blank form securing or connecting tabs 15 which are laterally spaced with respect to one another and which are continuations of the material forming the smaller knuckle 14. The purpose of these tabs 15 will be apparent hereinafter. The material of the blank which is used to form the smaller knuckle is also cut or grooved, as shown at 16, and preferably in a V-shape. The purpose of the cuts or grooves 16 is to permit and facilitate removal of a center section 17 of the smaller knuckle. These grooves are formed as a substantial extension of the inner edges of the tabs 15.

The cut portion 13 has lateral portions 18 on either side thereof which are utilized for forming connecting legs 18 between the smaller and larger knuckles. The tabs 15, as shown in Figure 3, are welded to the connecting legs 18. The welding of the tabs 15 to the connecting legs 18 securely attach these members one to another.

In forming a continuous chain following the formation of the smaller knuckle, the blank having the smaller knuckle formed thereon is placed in proper position on that end of a succeeding blank having a projection 12. Then by means of suitable mandrels and shaping devices the larger knuckle is formed around the smaller knuckle. The end 19 of the blank, extending from the inner limits 20 of the cuts forming 13, constitutes substantially a quarter of the periphery of the larger knuckle as seen in Figures 2 and 3 and this end is bent around the smaller knuckle 14. The tab 12 extends centrally from this portion, also as seen from Figure 3, and the outer extremities of the blank behind the projection 12 form laterally extending wings 21.

The material of the cut-out portion 13 is bent around the smaller knuckle until the free end thereof is in abutting relationship with the outer end of projection 12. The projection 12 and the cut-out portion 13 having the same width form a continuous larger knuckle 22 surrounding the smaller knuckle 14. The mating ends of the material forming the larger knuckle 22 are welded as at 23. When this operation has been completed two adjacent links are fastened to one another in operative connection. The bending away of the portion 13 forms the two laterally spaced connecting legs 18 as clearly shown in Figure 3.

The foregoing description of the formation of the individual links and the connection of adjacent links is the initial formation of a continuous chain contemplated in accordance with the teachings of the present invention. In this construction, due to the formation from a blank, there are only two attaching lateral extensions or legs on the larger diameter knuckle. The weld at 23 incorporated into the design of the larger knuckle 22 materially increases the strength of the link as compared with conventional detachable link chains since the knuckle cannot bend or spring open under heavy loads. This has been a serious drawback in previous known detachable link chains. Furthermore a large part of the load normally carried at the juncture of the knuckle with the connecting legs is transferred by means of the weld to that portion adjacent to the weld and then to the legs 18 in an advantageous manner. Due to this a considerable strengthening of the link through better attachment and load distribution of the knuckle is provided. The welds between the tabs 15 and legs 18 also strengthens the overall structure and at the same time permit a double thickness in that area of the legs 18 in proximity to the smaller knuckle 14. This, as compared with known commercial links, provides double the lateral bearing area. The weld adjacent the smaller knuckle 14 can be made on either the top or bottom of the link depending upon which way the stock is bent to form the smaller knuckle. This permits a choice advantageous to selecting the proper relative position of the axis of the cylindrical parts of the link in relation to the longitudinal line of stress or pull for maximum strength of the link.

The larger knuckle 22, as is apparent from the foregoing description, is formed in part by stock removed from between the connecting legs. The diameter of the knuckle 22 is increased by using stock from the preceding blank, namely the projection 12 cut from a preceding blank to form the tabs 15 for proper attachment to the legs 18. This eliminates waste of material and at the same time provides the advantage of increasing the diameter of the large knuckle 22.

The increased diameter of the larger knuckle 22 permits a proper proportioning of the link for maximum strength by providing long attaching extensions of the knuckle to the attaching leg as shown at 21 and allows the use of a connecting pin of sufficient diameter and accordingly adequate strength when a link has been separated from an adjoining link for repair, extension, and the like and is to be reattached by use of a pin. Additionally the increased diameter permits a more satisfactory weld by virtue of increased convenience and welding two surfaces of the same dimensions. This also allows the production of a link having a short distance between the knuckles thereby overcoming the limitation present in steel detachable links. Also, due to this increased diameter, a superior bearing area is provided which has manifest inherent structural and operational advantages.

The present invention, also as hereinbefore set forth, contemplates means whereby links can be connected and disconnected from one another. This is made possible by the removable center section 17 of smaller knuckle 14. This center section 17 is bounded by the grooves 16 which are of a proper depth to permit easy separation of the section from the remainder of knuckle 14 by proper tools or means while remaining of sufficient strength with respect to other parts of the link to insure proper functioning. Additionally a proper shape of the grooves, preferably V-shape, provides adequate strength and relatively smooth surfaces when the central portion 17 has been removed from knuckle 14. Grooves can be provided both on the outside and inside of the material forming knuckle 14 or on only one side thereof as desired. In the drawings the grooves 16 have been shown on only one side.

When it is desired to detach one link from another a wedge or the like is inserted between the portion 21 of a link and the next succeeding larger knuckle 22 which surrounds a smaller knuckle at the other end of the link. By driving this wedge downwardly the center section 17, and the larger knuckle 22 surrounding the same, will become separated from the remainder of knuckle 14 by a breaking away of the center section 17 along the groove lines 16. This is possible since the width of the center section 17 and that of the larger knuckle 22 are substantially identical. The broken away relationship of the parts is shown in Figure 8 wherein the center section 17 has been removed from its original position in the link. This figure, for clarity, does not show a larger knuckle surrounding the smaller knuckle. When reattaching a link or after having inserted a new link, the center section 17, which had previously been removed, is first inserted inside larger knuckle 22 which is then placed into position between the two spaced knuckles 14a and 14b, which remain of 14 after removal of the central section 17. Thereafter a connecting pin as shown in Figures 5A and 6A is inserted through the opening in portions 14a, 14b and 17 thereby effectively and securely rejoining the links in this position.

The connecting pins may be made in different forms. To insure the holding of the pins 24, and thereby the center section 17, with respect to members 14a and 14b the pins can be drilled at the ends and cotter pins 25 inserted therethrough. This construction is shown in Figures 5A and 6A.

As shown in Figures 5B and 6B it is also possible, where flush sides of the link are not required and where sufficient space is available, to use a standard bolt 26 having lock nut means 27 on the opposite end thereof.

An additional means for securing the pin is shown in cross-section in Figure 7. The pin 28 has ends recessed as shown at 29 and then rivets or the like, shown at 30, are inserted through holes drilled in the members 14a and 14b and also through holes drilled through the pin 28 into the recesses 29. In this type of construction when using the countersinking in the ends of the pins and rivets, the chain link is provided with flush sides which is desirable for certain types of use.

In some instances it is desirable to prevent rotation of the center section 17 with respect to the spaced knuckles 14a and 14b when the link is reassembled. Figure 9 shows one method of accomplishing this end. In the spaced knuckles 14a and 14b, on the inner surface thereof, there are provided grooves or keyways 31. The inner side of the center section 17 is also provided with a slot or keyway 32 which matches with those in the members 14a and 14b. A pin 33 slidably insertable through the members 14a, 17 and 14b is provided with a head 34 and a spline or key 35 for coaction with the grooves or keyways 31 and 32. This pin 33 is also drilled as shown at 36 and a cotter pin 37 can be inserted therethrough for preventing lateral movement of the pin with respect to the link.

Rotation of the center section 17 with respect to the spaced knuckles 14a and 14b can also be effected in other ways such as by using a hexagonal shaped pin and having the cylinder broached out to correspond therewith. Other suitable methods known to those in the art to which the present invention pertains can also be utilized as will be readily apparent.

As set forth in more detail in my aforementioned copending application Serial No. 100,034 the inner surface of the extensions 21 is concentric to the axis of the knuckle 22 and has a radius equal to that of the knuckle 14 for coacting with the knuckle 14 in sliding engagement therewith. Additionally the ends 38 of the extensions 21 form abutting or movement limiting stops by coacting with the tabs 15. The extensions 21 provide support for the laterally spaced knuckles 14a and 14b when the links have been reassembled and limit lateral play in the chain thereby strengthening the same against lateral as well as longitudinal stresses.

From the foregoing detailed description of embodiments of the invention the operation and construction will be readily understood. Manifestly minor changes in the details of construction will be apparent to those skilled in the art to which the present invention pertains without departing from the scope and spirit of the invention as defined in the appended claims.

I claim:

1. A chain link comprising spaced interconnected large and small knuckles, spaced grooves in said small knuckle inwardly placed from the outer ends thereof, said grooves constituting break lines and defining therebetween a removable center section in said small knuckle.

2. A chain link as claimed in claim 1 said grooves being V-shape in cross section and of sufficient depth and width to facilitate removal of said center section.

3. A chain link as claimed in claim 2, the outside diameter of the small knuckle and the inside diameter of the large knuckle being substantially equal, said large knuckle being adapted for surrounding and encompassing a small knuckle on a next succeeding link to form a continuous link chain.

4. A chain link as claimed in claim 3, the width of said large knuckle being equal to the width of the removable center section defined between said grooves on said small knuckle.

5. A chain link as claimed in claim 4, said knuckles being hollow and cylindrical.

6. A chain link as claimed in claim 5, integral lateral extensions on either side of said large knuckle, said extensions being forwardly directed and of arcuate configuration, and said extensions being concentric to the axis of said large knuckle.

7. A chain link as claimed in claim 6, said extensions being substantially 90° arcs, and said extensions and said large knuckle having flush inner surfaces.

8. A chain link as claimed in claim 7, said link being a continuous integral piece formed from a single blank of material, a central portion of the blank being cut and rolled to form the large knuckle and leaving an open central portion bounded by spaced legs interconnecting the large and small knuckles.

9. A chain link, comprising interconnected spaced knuckles, means defining a removable intermediate portion of the body of one said knuckle, said portion being shearable from and removable from said knuckle, a pin insertable through said knuckle having the removable center section, said pin being non-circular and said knuckle including said removable section being hollow and having a non-circular internal cross-section corresponding to that of said pin whereby said removable center section, after having been removed from said knuckle and reinserted, can be supported therein and prevented from rotation.

10. A chain link comprising interconnected spaced knuckles, means defining a removable intermediate portion of the body of one said knuckle, said portion being shearable from and removable from said knuckle, said knuckle and said removable center section therein having mating keyways on the inner surfaces thereof, a pin having a spline thereon adapted for insertion in said knuckle and said removable center section, said spline coacting with said keyways for preventing rotation of the removable center section after having been removed and reinserted in said knuckle.

11. A chain link comprising spaced interconnected knuckles, V-shaped peripheral spaced grooves in one said knuckle inwardly spaced from the outer ends thereof, said grooves constituting break lines and defining therebetween a removable center section in said knuckles.

12. A chain link, comprising interconnected spaced knuckles, means defining a knock-out removable intermediate portion of the body of one said knuckle, said means comprising break lines whereby said portion can be broken from and removed from said knuckle.

References Cited in the file of this patent
UNITED STATES PATENTS

| | | |
|---|---|---|
| 286,338 | Shields | Oct. 9, 1883 |
| 892,965 | Sevcik | July 7, 1908 |
| 1,107,808 | Locke | Aug. 18, 1914 |
| 1,810,724 | Parker | June 16, 1931 |
| 2,277,915 | Klaucke | Mar. 31, 1942 |
| 2,385,923 | Klaucke | Oct. 2, 1945 |

FOREIGN PATENTS

| | | |
|---|---|---|
| 77,735 | France | Sept. 6, 1867 |